United States Patent
Fabiyi et al.

(10) Patent No.: US 7,497,949 B2
(45) Date of Patent: *Mar. 3, 2009

(54) SYSTEM AND METHOD FOR OXYGENATING AN AEROBIC SLUDGE DIGESTER

(75) Inventors: Malcolm Ezekiel Fabiyi, Lagrange, IL (US); Richard A. Novak, Naperville, IL (US)

(73) Assignee: Praxair Technology, Inc., Danbury, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/881,845

(22) Filed: Jul. 30, 2007

(65) Prior Publication Data

US 2008/0116132 A1    May 22, 2008

Related U.S. Application Data

(63) Continuation-in-part of application No. 11/602,519, filed on Nov. 21, 2006, now Pat. No. 7,455,776.

(51) Int. Cl.
*C02F 3/00* (2006.01)

(52) U.S. Cl. ......................... 210/620; 210/220; 210/150

(58) Field of Classification Search ................ 210/620, 210/150, 220; 261/93
See application file for complete search history.

(56) References Cited

U.S. PATENT DOCUMENTS

| | | | | |
|---|---|---|---|---|
| 3,043,433 A | * | 7/1962 | Singer | 210/197 |
| 3,092,678 A | * | 6/1963 | Braun | 261/30 |
| 3,206,176 A | * | 9/1965 | Peterson | 261/29 |
| 3,210,053 A | * | 10/1965 | Boester | 261/6 |
| 3,439,807 A | * | 4/1969 | Danjes | 210/197 |
| 3,452,966 A | * | 7/1969 | Smolski | 261/77 |
| 3,666,103 A | * | 5/1972 | Green | 210/197 |
| 3,827,679 A | * | 8/1974 | Kaelin | 261/91 |
| 3,865,721 A | * | 2/1975 | Kaelin | 210/627 |
| 4,136,023 A | * | 1/1979 | Kirk et al. | 210/604 |
| 4,192,740 A | * | 3/1980 | Savard et al. | 210/614 |
| 4,256,839 A | | 3/1981 | Solomons et al. | |
| 4,263,143 A | * | 4/1981 | Ebner et al. | 210/629 |
| 4,454,077 A | * | 6/1984 | Litz | 261/91 |
| 4,455,232 A | * | 6/1984 | Reid | 210/628 |
| 4,919,849 A | | 4/1990 | Litz et al. | |
| 5,451,348 A | | 9/1995 | Kingsley | |

(Continued)

FOREIGN PATENT DOCUMENTS

JP    1258732    10/1989

*Primary Examiner*—Chester T Barry
(74) *Attorney, Agent, or Firm*—Robert J. Hampsch

(57) ABSTRACT

A system and method for oxygenating an aerobic sludge digester is provided. The disclosed embodiments include an aerobic sludge digester tank or vessel having a mechanically agitated contactor disposed therein, an oxygen injection subsystem adapted to inject oxygen into the digester tank proximate the mechanically agitated contactor. The embodiments of the mechanically agitated contactor include an agitator or impeller disposed within the draft tube which makes the draft tube the primary site for the gas-liquid mixing. In particular, the agitator or impeller is adapted to create gas bubbles having an average diameter between about 0.3 mm and 3.0 mm which are then dispersed into the aerobic digester. The mass transfer efficiency associated with the present system and method is enhanced from the combined effect of oxygen dissolution into the sludge and greater bubble residence time.

5 Claims, 2 Drawing Sheets

U.S. PATENT DOCUMENTS

| | | | |
|---|---|---|---|
| 5,874,003 A * | 2/1999 | Rose | 210/626 |
| 5,916,491 A | 6/1999 | Hills | |
| 5,925,290 A | 7/1999 | Hills | |
| 6,123,446 A | 9/2000 | Schuchardt | |
| 6,135,430 A * | 10/2000 | Bergman et al. | 261/93 |
| 6,145,815 A * | 11/2000 | Cheng et al. | 261/93 |
| 6,245,237 B1 * | 6/2001 | Blough et al. | 210/620 |
| 6,461,500 B1 * | 10/2002 | Hoage et al. | 210/150 |
| 6,464,384 B2 | 10/2002 | Kubera et al. | |
| 6,761,797 B2 | 7/2004 | Kohlgruber et al. | |
| 6,863,817 B2 | 3/2005 | Liu et al. | |
| 7,329,351 B2 * | 2/2008 | Roberts et al. | 210/620 |
| 7,413,656 B2 * | 8/2008 | Allen et al. | 210/622 |
| 2004/0007523 A1 * | 1/2004 | Gabon et al. | 210/605 |
| 2005/0258094 A1 * | 11/2005 | Chiba | 210/627 |

* cited by examiner

SYSTEM AND METHOD FOR OXYGENATING AN AEROBIC SLUDGE DIGESTER

CROSS REFERENCE TO RELATED APPLICATIONS

This application is a continuation-in-part of U.S. patent application Ser. No. 11/602,519 filed Nov. 21, 2006, now U.S. Pat. No. 7,455,776 the disclosure of which is incorporated by reference herein.

FIELD OF THE INVENTION

The present invention relates to gas-liquid mixing operations, and more particularly, to a system and method for oxygenating high solid content material in an aerobic sludge digester.

BACKGROUND

Digestion in treatment of wastewater is a key process for the reduction of bio-solids and pathogen counts prior to any solids disposal. Most wastewater treatment plants employ some kind of digestion process with aerobic digestion of sludge becoming increasingly popular, in contrast to anaerobic digestion.

Aerobic sludge digestion is one process that may be used to reduce both the organic content and the volume of the sludge. Under aerobic conditions, a large portion of the organic matter in sludge may be oxidized biologically by microorganisms to carbon dioxide and water. The process generally results in approximately 50% reduction in solids content. Aerobic sludge digestion facilities may be designed for either batch or continuous flow operations.

Aerobic digestion of sludge is increasingly preferred over anaerobic digestion as it enables an improved dewatering process, better sludge stability, reduced on-site tankage requirements, and generally less offensive odors. Moreover, aerobic sludge digestion provides cost and performance advantages over other conventional methods of reducing sludge including lower capital costs, ease of operation, and system reliability.

Unfortunately, conventional air-based aerobic sludge digestion systems tend to have higher operating costs mainly attributable to the consumption of excessive amounts of power, on average about 1500 hp per million gallons of treated material. This high power demand is generally due to the highly viscous nature of digested liquor and the low mass transfer achieved when using conventional jet aerators or air diffuser systems.

What is needed therefore is an energy efficient method and system for aerobic sludge digestion in wastewater treatment plants.

SUMMARY OF THE INVENTION

In one aspect, the present invention may be characterized as a method of treating high-solids content material in an aerobic digester of a wastewater system, the aerobic digester having a mechanically agitated contactor disposed therein, the method comprising the steps of (a) disposing the high-solids content material within the aerobic digester; (b) introducing oxygen into the aerobic digester at a location proximate to the mechanically agitated contactor; (c) agitating the high-solids content material and oxygen to produce gas bubbles within the high-solids content material, the gas bubbles having an average diameter of between about 0.3 mm and 3.0 mm; and (d) dispersing the high-solids content material including the gas bubbles into the aerobic digester to increase residency time of the gas bubbles within the aerobic digester.

In another aspect, the present invention may be characterized as an aerobic digester system for a wastewater treatment process comprising: an aerobic digester tank, having an inlet, an exit and adapted for containing a high solids content sludge; a hydrodynamic structure disposed within the aerobic digester tank; an oxygen supply subsystem adapted to supply oxygen into the tank at a location proximate the hydrodynamic structure, wherein the hydrodynamic structure is further adapted for oxygenating the high solids content sludge with oxygen bubbles having an average diameter of between about 0.3 mm and 3.0 mm and dispersing the high solids content sludge containing the oxygen bubbles within the aerobic digester tank.

The mass transfer efficiency associated with the present methods and system are enhanced as a result of the combined effect of the bubble size, the oxygen dissolution into the sludge at a location near the hydrodynamic structure and greater bubble residence time of the oxygen bubbles within the sludge in the aerobic digester.

BRIEF DESCRIPTION OF THE DRAWINGS

The above and other aspects, features, and advantages of the present invention will be more apparent from the following, more descriptive description thereof, presented in conjunction with the following drawings, wherein.

DETAILED DESCRIPTION

Figure 1:
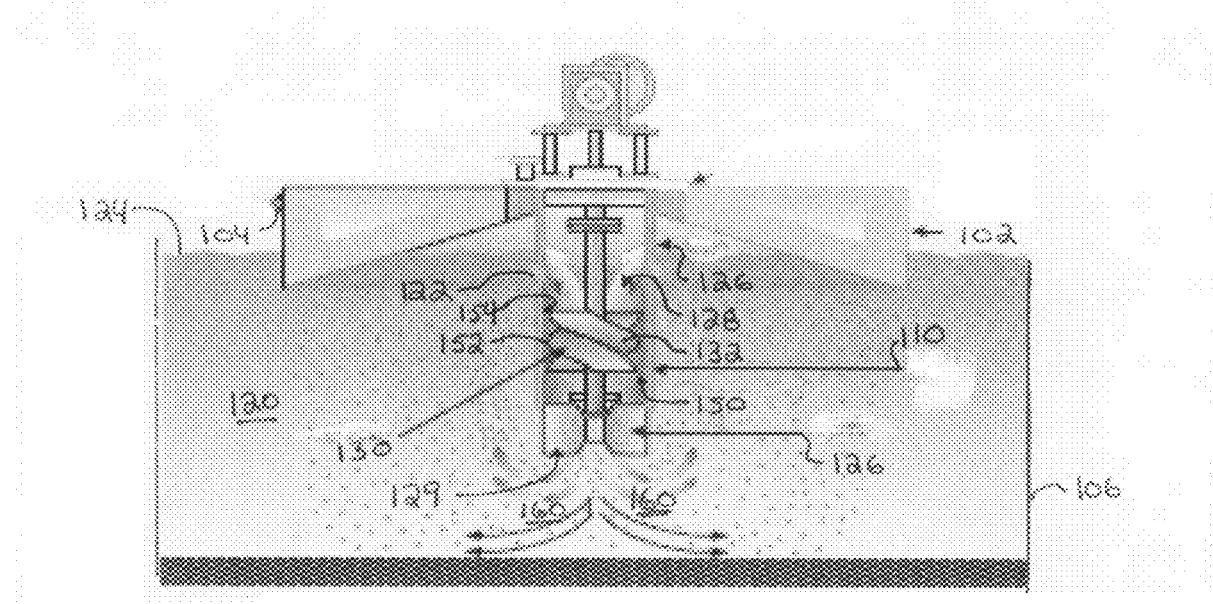
FIG. 1 is a schematic view of the present oxygen-based aerobic sludge digester in a wastewater treatment system.

Turning now to FIG. 1, there is shown an embodiment of the invention using an in-situ oxygenator applied to an aerobic digester of a wastewater treatment system 100. As seen therein, the in-situ oxygenator includes a float assembly 102 having an anchor ring 104 which is placed in an aerobic digester 106 of a wastewater treatment system 100. In the present application, the material within the aerobic digester 106 is a high solid content material 120, typically on the order of greater than 10 grams per liter solids content, and more preferably between 10 and 40 grams per liter solids content. Extending in a downward orientation from the float assembly 102 is a draft tube 110. The draft tube 110 preferably has circumferential openings 122 located below the top surface 124 of the high-solids content material 120 in the aerobic digester 106. Baffles 126 are equilaterally spaced and symmetrically positioned around the openings 122 which are proximate to the entrance 128 to the draft tube 110. Additional baffles 126 can be located proximate the exit 129 of the draft tube 110. A helical impeller 130 is disposed within the draft tube 100 and generally comprises one or more blades 132 that are affixed to the impeller shaft 134 for rotation with the impeller shaft 134 by motor 136, which is preferably placed on top of the float assembly 102.

The motor is adapted to drive the impeller shaft 134 in the direction of arrow 138, and in turn move the high solids content material and gas within the draft tube 110 in a downward direction of arrow 136. The oxygen gas is preferably introduced through the gas inlet 140 which discharges the oxygen gas proximate the entrance 128 of the draft tube 110. Recirculation of the high solids content material 120 occurs as a result of a mechanical agitation within the draft tube 110 and the corresponding downward force of the high solids content material 120 in the draft tube 110. As the high solids content material 120 with gas bubbles is dispersed from the exit 129 of the draft tube 110, a suitable volume of replacement material having some mass of oxygen is ingested through openings 122 near the entrance 128 of draft tube 110.

A helical impeller 130 is positioned within the draft tube 110 in a manner that permits the wastewater solution to be drawn in at the entrance 128 of the draft tube 110 and discharged at the exit 129 of the draft tube 110. In some arrangements, the rotating action of the impeller 130 causes the generation of a vortex at the top surface of the material or solution that facilitates oxygen ingestion.

Intimate gas-liquid contacting occurs in the draft tube 110 at or near the impeller 130. In the illustrated embodiment, a continuous supply of oxygen is preferably introduced to the aerobic digester 106 at or near the vortex at the entrance of the draft tube 110 and proximate the impeller 130. In the alternate arrangements where the impeller is sufficiently submerged within the material, there is no vortex formed at the surface and the gas ingestion is preferably accomplished via a high pressure direct injection of the oxygen into the high solids content solution 120 proximate the impeller 130.

Any type of hydrodynamic enclosure or structure disposed in the aerobic digester can be used in lieu of the draft tube 110. Such similar hydrodynamic enclosures should be adapted to spatially define the area of intimate gas-liquid contacting. The rate of gas ingestion in the illustrated embodiments can be controlled by direct adjustment of the injection rate of the oxygen or the speed of the impeller 130 to optimize processing conditions over variations in the viscosity and solids content of the solution within the aerobic digester 106. Examples of such structures would include the I-SO and Mixflo™ oxygenating systems commercially available from Praxair, Inc.

Bulk mixing of the solution is effected in the aerobic digester 106 by the dispersion action of the stream as it exits the draft tube 110. Undissolved oxygen in the stream disengage from the stream at a critical velocity that corresponds to the average buoyancy velocity of the gas bubbles at the given process conditions. As the viscosity of the solution increases, the depth of this disengagement zone 160 extends further from the distal end or exit 129 of the draft tube 110 to the floor or bottom of the aerobic digester 106. The extension of the disengagement zone 160 is attributable to the reduced diameters of the gas bubbles as well as the increased viscous drag on the gas bubbles. Together, these result in an increase in the gas bubble residence time within the aerobic digester 106 and improved dissolving of the gas bubbles in the high solids content solution, as well as the overall gas utilization and the mass transfer efficiency associated with the mixing process.

Referring again to FIG. 1, recirculation of the solution occurs as a result of the mechanical agitation within the draft tube 110 and the corresponding downward force of the solution in the draft tube 110 or similar hydrodynamic structure. As the solution with gas bubbles is dispersed or ejected from the exit 129 of the draft tube 110, a suitable volume of replacement solution having some mass of oxygen is ingested near the entrance 128 of the draft tube 110.

In the preferred embodiments, the impeller 130 is disposed at least partially within the draft tube 110 and defines a radial clearance 150 between the tip 152 of the impeller blade 132 and the interior wall 154 of draft tube 110 or similar hydrodynamic structure. In a preferred embodiment of the disclosed system 100, the radial clearance 150 is less than or equal to one-half the impeller diameter ($D_i$) and more preferably the radial clearance 150 will be less than 10% of the impeller diameter ($D_i$). When used with high viscous solutions, this closer arrangement of the impeller 130 with the interior wall 154 of the draft tube 110 tends to impart higher shear forces to the solution and gases in or near the impeller region and thereby achieves optimal bubble size distribution.

When used with high-solid content material in a wastewater application, the close arrangement of the impeller 130 with the interior wall of the draft tube 110 or other hydrodynamic structure tends to impart higher shear forces to achieve the optimal bubble size distribution, namely 0.3 mm to 3.0 mm. As explained below, the optimized bubble size distribution of the oxygen within the high solids content material enhances the mass transfer efficiency of the mixing process.

The preferable flow orientation of the draft tube 110 and impeller 130 achieves a vertically downward flow of solution and gas (i.e. downflow), so as to maximize the increase in gas bubble residence time within the aerobic digester. However, the present embodiment can also be beneficially practiced using other orientations including inline flow orientations, horizontal flow orientations, angular flow orientations (upflow and downflow), and vertical upflow orientations. Recirculation pumps, ejectors and other auxiliary devices can also be incorporated, as required within the presently disclosed system.

There are usually significant differences in the effectiveness of gas-liquid transfer in any mixing system as the viscosity of the solution changes. In conventional gas-liquid mixing systems, it is generally understood by those skilled in the art that mass transfer efficacy is inversely proportional to the viscosity of the solution. One of the primary factors responsible for the lower mass transfer efficacy in conventional mixing systems is believed to be the effect of the viscosity of the solution on the gas bubble size distribution. Also, the decrease in mass transfer efficacy in conventional gas-fluid mixing systems as the viscosity of the solution increases is typically more pronounced at higher gas and liquid flow rates.

In wastewater treatment processes, the impact of viscosity of the solution on the efficacy of the mass transfer process can be tracked using various parametric measures. In particular, the Standard Oxygen Transfer Rate (SOTR) is ascertained by performing standardized aeration tests using clean water under specified test conditions, namely 20° C., zero dissolved oxygen and a pressure of 760 mm Mercury. Mass transfer rates obtained in field test conditions other than the SOTR specific test conditions are referred to as Actual Oxygen Transfer Rate (AOTR).

It is known that as the viscosity of the wastewater increases, either due to an increase in the solids levels in the wastewater or due to an increase in the viscous components of the waste stream, the Actual Oxygen Transfer Rate, or AOTR using conventional wastewater aeration schemes falls to a value that is lower than the empirically determined SOTR. The variation in the AOTR and the SOTR are generally due to differences in the mass transfer coefficient, ($K_L a$) between the standard or controlled process conditions and the actual process conditions. The ratio of the mass transfer coefficient in actual conditions to the mass transfer coefficient in standard conditions is given by a parameter known as the alpha factor ($\alpha$), where:

$$\alpha = \frac{K_L a(\text{Actual system})}{K_L a(\text{Clean water})}$$

The relationship between the mass transfer coefficient, $K_L a$, and the Actual Oxygen Transfer Rate is generally represented by the following equation:

$$AOTR = SOTR\left(\frac{\beta C_{S,T,H} - C_L}{C_{s,20}}\right)(1.024^{T-20})(\alpha)(F)$$

Where $\beta$ is the salinity-surface tension correction factor, F is the fouling factor, and $C_{S,T,H}$ is the average dissolved oxygen concentration in clean water in an aeration or reactor tank at temperature T (° C.), and altitude H (m). Where all other variables stay constant, the alpha factor provides a measure for the ratio of the AOTR and the SOTR.

All tests were conducted in a 200 gallon acrylic test vessel using test samples of about 600 liters of carboxyl methyl cellulose (CMC) solution. CMC was used as the test solution for approximating activated sludge solutions of various viscosities. A conversion chart was established for transforming viscosity measurements of the CMC solution to those of activated sludge equivalents. Activated sludge from an industrial wastewater treatment facility that processes guar was utilized for creating the CMC to sludge conversion chart and determining the relationship between the viscosity and the concentration of solids in the wastewater solution.

In the various test runs, a Mechanically Agitated Contactor (MAC) system consisting of a 3" impeller disposed in a 3.3" internal diameter draft tube and driven by a 1.5 HP DC motor was used. A source of oxygen was introduced into the test vessel proximate the entrance of the draft tube. The mechanically agitated contactor test results were then compared to test results obtained using (i) a 6×20 μm 6" disc spargers and (ii) 3×150 μm commercial Fine Bubble Diffused Air Spargers attached to a source of compressed air and placed in the test vessel.

Figure 2:
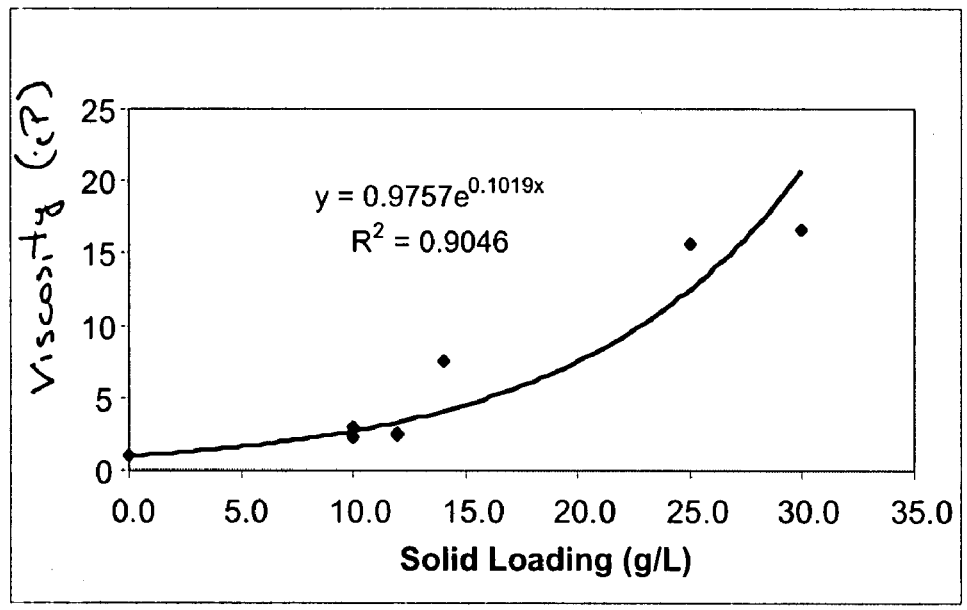
FIG. 2 is a graphical representation of the effect of solids concentration on the viscosity of activated sludge in a wastewater treatment process.

FIG. 2 graphically depicts the effect of solids concentration on the viscosity of activated sludge. In the present graph, the viscosity of the activated sludge rises as the accumulation of solids increases. In particular, the data in FIG. 2, shows an exponential relationship between the apparent viscosity of activated sludge and the concentration of solids within the sludge. For the illustrated graph, the exponential relationship is characterized as:

$$y = 0.9757 e^{0.1019x}$$

where 'y' is apparent viscosity in centipoise and 'x' is the solids concentration or equivalent Mixed Liquor Suspended Solids (MLSS) concentration of the activated sludge in grams per liter.

Figure 3:
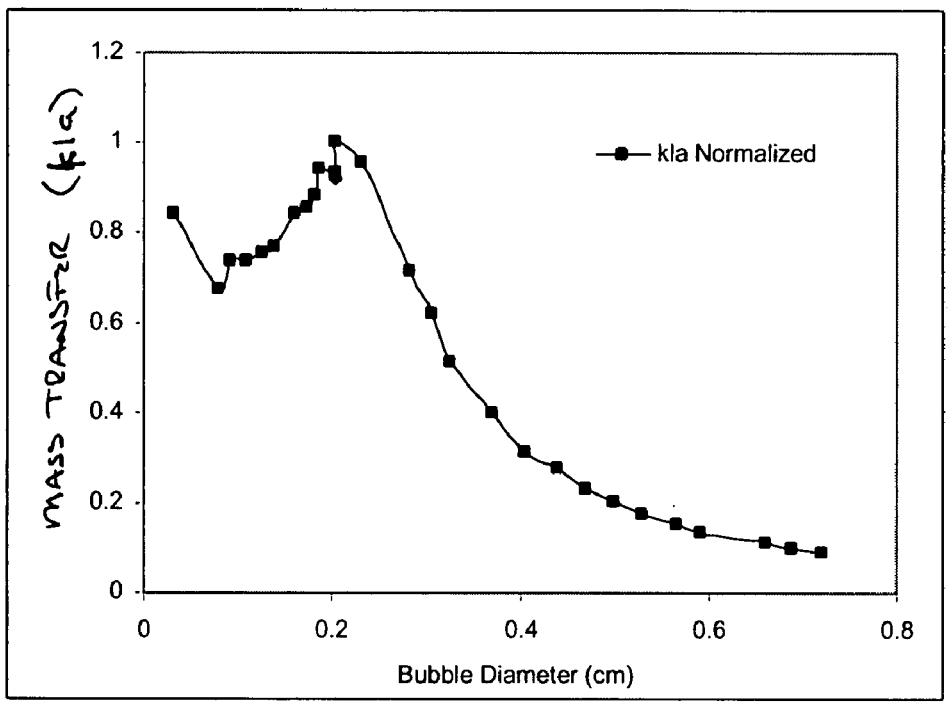
FIG. 3 is a graphical representation of the correlation between the average gas bubble size and the mass transfer coefficient in a gas-liquid mixing system.

Turning now to FIG. 3, there is shown a graphical representation of the correlation between the average gas bubble size and the mass transfer coefficient. As seen therein, the overall mass transfer coefficient is impacted significantly by the average gas bubble diameter. It is therefore conceivable that the mass transfer could be optimized in a system where the gas bubble diameter ($d_b$) is modified either by coalescence or breakup to fall within the optimum range of between about 0.3 mm to about 3.0 mm in diameter. Modification of the gas bubble diameter is achieved in the presently disclosed systems and method by control of the gas delivery mode and design and operating characteristics of the impeller.

Table 1 provides a summary of the results for the mass transfer tests conducted to compare the mechanically agitated contactor system of the present invention to conventional fine bubble diffuser based gas-liquid mixing systems. As seen in Table 1 and associated FIG. 4, the present system and method for enhanced gas-liquid mixing exhibits an alpha factor trend that is substantially different than those exhibited using conventional diffused air mixing systems. The test results have also identified a range of conditions where the alpha factor associated with the mechanically agitated contactor system is greater than 1.0. This suggests that the mass transfer efficacy on the treatment of wastewater using the Mechanically Agitated Contactor (MAC) system and the direct injection of oxygen exceeds the mass transfer efficacy of the conventional diffused air mixing systems in nearly all cases and is in some cases better than the mass transfer efficacy of the mechanically agitated contactor system using clean water. These results will translate to a greatly reduced aeration power requirement to achieve the targeted oxygenation and permits the wastewater treatment system to be operated at higher solids loading. In practice this means a reduction in operating costs, fewer solid waste problems, more flexibility for existing wastewater treatment systems, and enables the construction of smaller footprint wastewater treatment systems.

In addition, it appears that for wastewater systems having solids concentration of about 1 to about 10 g/L, the mass transfer coefficients associated with oxygen injection and Mechanically Agitated Contactor (MAC) system of the present invention generally increased with corresponding increase in solids concentration. However, as evidenced from the aforementioned tests, when the solids concentration in the solution or MLSS equivalent rose above 10 g/L, the mass transfer coefficients associated with the mechanically agitated contactor system generally decreased as the solids concentration increased.

TABLE 1

Mass Transfer Test Data

| Viscosity (cP) | MLSS (g/l) | Alpha Factor (α) Diffuser System | Alpha Factor (α) MAC System |
|---|---|---|---|
| 1.0 | 0 | 1 | 1 |
| 1.2 | 2 | 0.85 | 1.02 |
| 1.5 | 4 | 0.72 | 1.04 |
| 1.8 | 6 | 0.61 | 1.06 |
| 2.2 | 8 | 0.51 | 1.08 |
| 2.7 | 10 | 0.44 | 1.10 |
| 3.3 | 12 | 0.37 | 1.18 |
| 4.1 | 14 | 0.31 | 1.17 |
| 5.0 | 16 | 0.27 | 1.15 |
| 6.1 | 18 | 0.22 | 1.12 |
| 7.5 | 20 | 0.19 | 1.10 |
| 9.2 | 22 | 0.16 | 1.08 |
| 11.3 | 24 | 0.14 | 1.05 |
| 13.8 | 26 | 0.12 | 1.03 |
| 16.9 | 28 | 0.10 | 1.01 |
| 20.7 | 30 | 0.08 | 0.98 |
| 25.4 | 32 | 0.07 | 0.96 |
| 31.2 | 34 | 0.06 | 0.94 |
| 38.2 | 36 | 0.05 | 0.91 |
| 46.9 | 38 | 0.04 | 0.89 |
| 57.5 | 40 | 0.04 | 0.87 |

Figure 4:
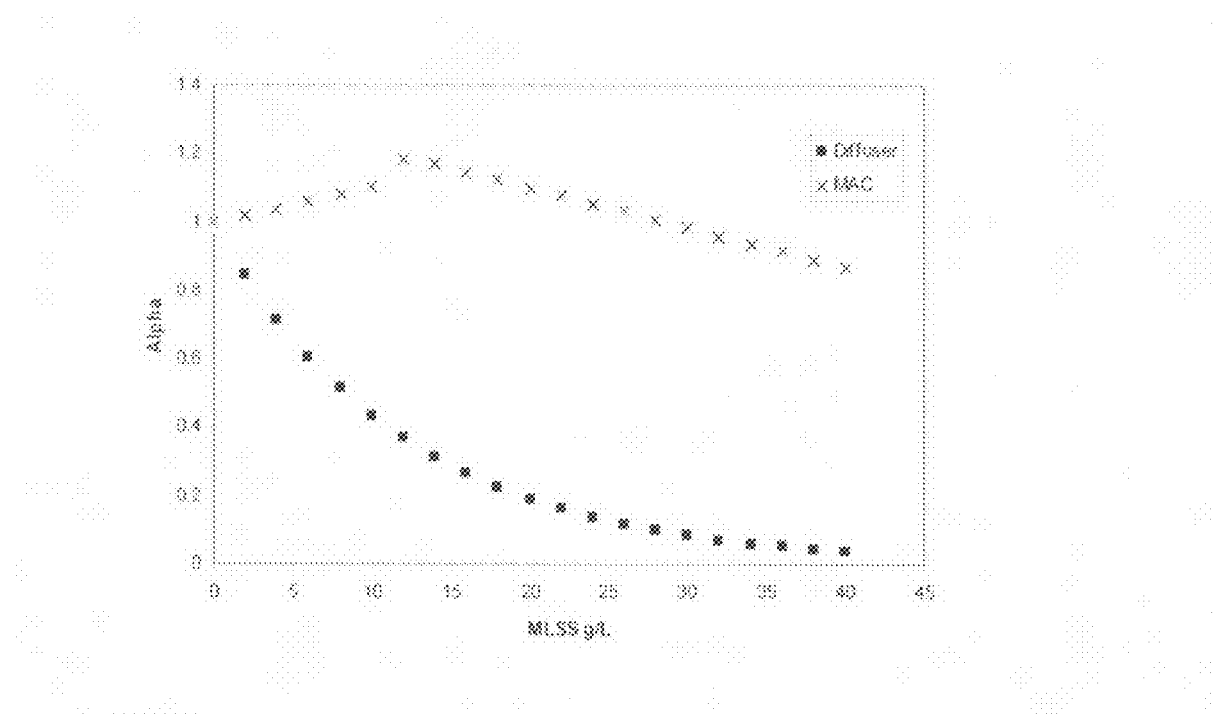
FIG. 4 is a graphical representation comparing the alpha factors for conventional fine bubble diffuser systems and the mechanically agitated contactor system of the kind embodied in the present invention.

For the diffused air system, the data in Table 1 when considered in conjunction with FIG. 4 indicates that the gas bubble diameters were larger than 2 mm or 3 mm at typical solids concentration levels or equivalent MLSS levels of greater than about 10 g/L. As described above with reference to FIG. 3, a gas bubble diameter of greater than about 2 mm or 3 mm contributes to the lower mass transfer efficacy in such conventional gas-liquid mixing systems. Keep in mind, that the viscosity of the wastewater solution and the solids concentration in the wastewater solution are closely related (See FIG. 2).

Conversely, using a mechanically agitated contactor system as embodied in the present system, within certain limits, defined from 1-12 g/L of solids in the case of wastewater, the bubble diameter generally decreases as the viscosity of the solution increases resulting in superior mass transfer characteristics compared to conventional fine bubble diffuser systems.

It was also observed during tests of the present mechanically agitated contactor system, that the depth to which the bubble plume descends prior to disengagement from the jet stream was greater as the viscosity of the wastewater solution increases. The buoyant velocity of the gas bubble is known to be impacted by the drag force imparted on the gas bubble the solution. The drag force imparted on the gas bubble is, in turn, a function of the viscosity of the solution. Therefore, with increases in the viscosity of the wastewater solution, the drag force on the gas bubble increases, causing the bubbles to be retained in the exit stream. The exit stream and the entrained gas bubble plume generally descends lower into the aerobic digester resulting in a longer gas bubble entrainment in the stream exiting from the draft tube, which further contributes to the improved mass transfer efficiency of the mechanically agitated contactor system.

While the invention herein disclosed has been described by means of specific embodiments and processes associated therewith, numerous modifications and variations can be made thereto by those skilled in the art without departing from the scope of the invention as set forth in the claims or sacrificing all its material advantages.

For example, the impeller or agitator provided in the disclosed embodiments can be of various configurations or impeller types including an axial flow fan turbine, axial flow pitched blade, axial flow propeller, screw centrifugal, open radial vane, semi open radial vane, closed radial vane, radial flow anchor, radial flow paddle, radial flow turbine, or other unspecified type of impeller. In addition, the disclosed system could be configured to utilize a plurality of mechanically agitated contactors within the aerobic digester each having an impeller encased within a draft tube.

Preferably, the presently disclosed system and process is most advantageous when used in a gas-liquid mixing process where the viscosity of the wastewater solution exceeds about 10 centipoise, and more preferably where the viscosity of the wastewater solution is between 10 and 100 centipoise.

INDUSTRIAL APPLICABILITY

In utilizing the presently disclosed systems and methods for enhanced gas-liquid mixing in high viscous solutions, such as an aerobic digester, the presently disclosed methods allow for more efficient gas-liquid contacting and superior mass transfer characteristics within the aerobic sludge digester as a result of the larger total surface area of the ingested oxygen and the increased bubble residence time within the aerobic sludge digester.

When compared to the prior art aerobic sludge digester systems and methods, the superior mass transfer properties obtained using the presently disclosed systems and methods translates to use of less mixing equipment, potentially smaller footprint and substantially less time and energy to achieve the same level of gas-liquid mixing.

Application of the present invention to an aerobic digester employed as part of a wastewater treatment process yields several notable advantages. Such advantages include the ability to operate the aerobic sludge digester at significantly higher sludge concentrations, use of less aeration power to achieve the desired oxygenation levels, increased cell residence time, and overall reduction of waste sludge production.

The above-identified methods and systems for enhanced oxygenation in an aerobic sludge digester can be utilized alone or in conjunction with other sludge reduction or wastewater treatment techniques. Moreover, each of the specific steps involved in the preferred process, described herein, and each of the components in the preferred systems are easily modified or tailored to meet the peculiar design and operational requirements of the particular application in which it is used.

What is claimed is:

1. A method of treating high-solids content material in an aerobic digester of a wastewater system, the aerobic digester having a mechanically agitated contactor including a draft tube and an agitator disposed therein, the method comprising the steps of:
    disposing the high-solids content material having a solids loading of greater than about 10 grams per liter within the draft tube in the aerobic digester;
    introducing oxygen into the aerobic digester at a location proximate to an entrance of the draft tube;
    agitating the high-solids content material and oxygen within the draft tube to produce oxygen bubbles within the high-solids content material, the oxygen bubbles having an average diameter of between about 0.3 mm and 3.0 mm; and
    dispersing the high-solids content material including the oxygen bubbles from an exit of the draft tube into the aerobic digester to increase residency time of the oxygen bubbles within the high-solids content material in the aerobic digester.

2. The method of claim 1 wherein the high-solids content material has a solids loading of between about 10 grams per liter and 40 grams per liter.

3. The method of claim 1 wherein the agitator further comprises an impeller having a diameter and defining a radial clearance between a tip of the impeller and the draft tube of between about 0.05 to 0.5 times the diameter of the impeller.

4. An aerobic digester system for a wastewater treatment process comprising:
    an aerobic digester tank, having an inlet, an exit and adapted for containing a high solids content sludge, wherein the high-solids content sludge has a solids loading of between about 10 grams per liter to 40 grams per liter;
    an in-situ oxygenator disposed within the aerobic digester tank, the in-situ oxygenator comprising a draft tube and an impeller disposed therein;
    an oxygen supply subsystem adapted to supply oxygen into the tank at a location proximate the in-situ oxygenator; and
    the in-situ oxygenator further adapted for oxygenating the high solids content sludge with oxygen bubbles having an average diameter of between about 03 mm and 3.0 mm and dispersing the high solids content sludge containing the oxygen bubbles within the aerobic digester tank.

5. The system of claim 4 wherein the impeller defines a diameter and a radial clearance between a tip of the impeller and the draft tube of between about 0.05 to 0.5 times the diameter of the impeller.

* * * * *